(12) United States Patent
Wells et al.

(10) Patent No.: US 7,080,054 B2
(45) Date of Patent: Jul. 18, 2006

(54) BIOMIMIC ARTIFICIAL NEURON

(75) Inventors: Richard B. Wells, Moscow, ID (US);
Bruce Calvert Barnes, Moscow, ID (US)

(73) Assignee: Idaho Research Foundation, Inc., Moscow, ID (US)

( * ) Notice: Subject to any disclaimer, the term of this patent is extended or adjusted under 35 U.S.C. 154(b) by 0 days.

(21) Appl. No.: 10/893,407

(22) Filed: Jul. 16, 2004

(65) Prior Publication Data

US 2005/0102247 A1    May 12, 2005

Related U.S. Application Data

(60) Provisional application No. 60/487,710, filed on Jul. 16, 2003.

(51) Int. Cl.
*G06N 3/63* (2006.01)
*G06N 3/06* (2006.01)
*G06F 15/18* (2006.01)
*G06G 7/00* (2006.01)
*G06E 1/00* (2006.01)

(52) U.S. Cl. .......................................... 706/26; 706/43
(58) Field of Classification Search ................ 706/26, 706/43
See application file for complete search history.

(56) References Cited

U.S. PATENT DOCUMENTS

| | | | | |
|---|---|---|---|---|
| 4,479,241 A * | 10/1984 | Buckley | ...................... | 382/159 |
| 5,122,983 A * | 6/1992 | Massengill | .................. | 708/838 |
| 5,140,538 A * | 8/1992 | Bass et al. | ...................... | 708/3 |
| 5,515,454 A * | 5/1996 | Buckley | ...................... | 382/157 |
| 5,867,397 A * | 2/1999 | Koza et al. | .................... | 703/14 |
| 5,940,529 A * | 8/1999 | Buckley | ...................... | 382/155 |
| 6,198,421 B1 * | 3/2001 | Doyle et al. | ................. | 341/159 |
| 6,360,191 B1 * | 3/2002 | Koza et al. | ..................... | 703/6 |
| 2004/0153426 A1 * | 8/2004 | Nugent | ......................... | 706/25 |
| 2004/0162796 A1 * | 8/2004 | Nugent | ......................... | 706/27 |
| 2004/0193558 A1 * | 9/2004 | Nugent | ......................... | 706/25 |
| 2005/0015351 A1 * | 1/2005 | Nugent | ......................... | 706/33 |

OTHER PUBLICATIONS

Design of an 8-bit neuron MOSFET A/D converter using subranging method Dong-Chual Kang; Chang-II Kim; Han-Kil Park; Sang-Bock Cho; Jong-Hwa Lee; VLSI and CAD, 1999. ICVC '99. 6th International Conference on Oct. 26-27, 1999 pp.:533-536.*

(Continued)

*Primary Examiner*—Anthony Knight
*Assistant Examiner*—Michael B. Holmes
(74) *Attorney, Agent, or Firm*—Ormiston & McKinney, PLLC

(57) ABSTRACT

An artificial neuron is formed from an input subcircuit, a capacitor free leaky integrator subcircuit, and an output switching subcircuit. The input subcircuit is configured to supply a pulsed input signal. The capacitor free leaky integrator subcircuit is configured to supply a parasitic capacitance and to utilize the parasitic capacitance to provide differing time constants for the rising and falling edges of an output signal produced in response to the pulsed input signal. The output switching subcircuit s configured to, upon receipt of a sufficient output signal from the capacitor free leaky integrator subcircuit, switch off the input subcircuit and to release a neuron firing signal.

6 Claims, 16 Drawing Sheets

OTHER PUBLICATIONS

Self-reconstruction of mesh-arrays with 1 1/2 -track switches by digital neural circuits Takanami, I.; Horita, T.; Defect and Fault Tolerance in VLSI Systems, 1997. Proceedings., 1997 IEEE International Symposium on Oct. 20-22, 1997 pp.:218-226.*

Speed-up of learning in second order neural networks and its application to model synthesis of electrical devices Wilk, J.; Wilk, E.; Morgenstern, B.; Neural Networks, 1996., IEEE International Conference on vol. 2, Jun. 3-6, 1996 pp.:991-996 vol.2.*

* cited by examiner

1: output signal responding to a 0.25V, 2μS input signal, where VGR=1.0V
2: output signal responding to a 0.25V, 2μS input signal, where VGR=1.1V
3: output signal responding to a 0.25V, 2μS input signal, where VGR=1.2V
4: output signal responding to a 0.25V, 2μS input signal, where VGR=1.3V
5: output signal responding to a 0.25V, 2μS input signal, where VGR=1.4V

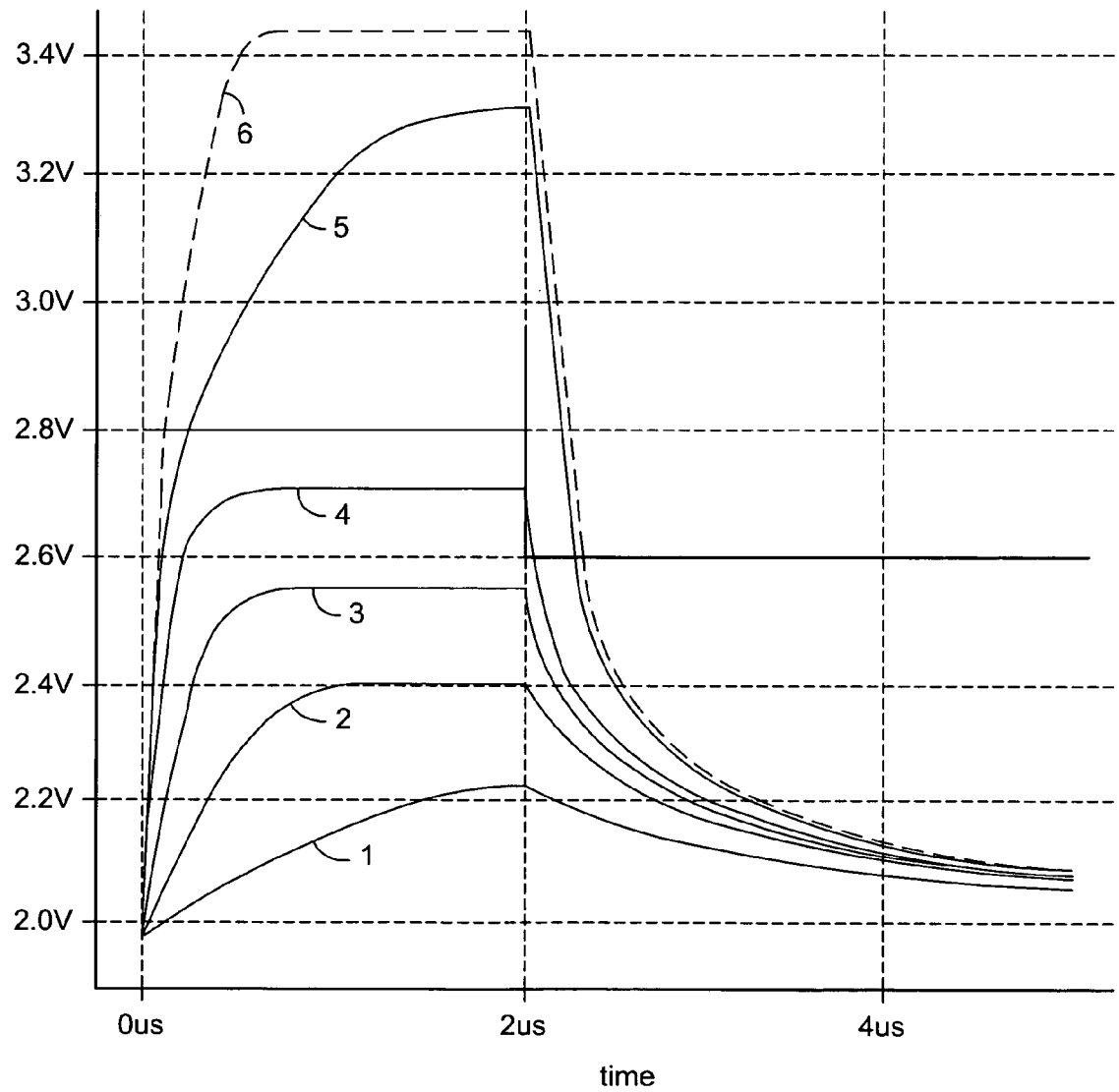

1: output signal responding to a 0.10V, 2μS square pulse input signal
2: output signal responding to a 0.15V, 2μS square pulse input signal
3: output signal responding to a 0.20V, 2μS square pulse input signal
4: output signal responding to a 0.25V, 2μS square pulse input signal
5: output signal responding to a 0.30V, 2μS square pulse input signal
6: output signal responding to a 0.35V, 2μS square pulse input signal

FIG. 3

| W/L RATIOS FOR CMOS TRANSISTORS ||
|---|---|
| *Sub-Circuit* | *Components* |
| Synaptic Weight Current Mirrors | Mexc: Application Dependent<br>Minh: Application Dependent |
| Summing Resistors | M3: 5/10, M4: 5/2 |
| Buffers | M5-M6: 4/4, M31: 4/20, M32: 4/6 |
| Leaky Integrator NLRs | M7: 4/4, M8: 4/20 |
| Leaky Integrator Amplifier | M9: 8/2, M10-M11: 20/2, M12: 4/5 |
| Inverting Schmidt Trigger | M13: 4/4, M14-M16: 4/8, M17: 4/20, M18: 4/14 |
| Inverters | M19-M22: 4/2.67 |
| Gate Voltage Circuit | M23: 4/4, M24-M24: 4/2, M26: 4/3, M27: 4/2 |
| Vclamp Circuit | M28: 4/2, M29: 4/3, M30: 4/25 |
| Switch Transistors | Ms_1 & Ms_2: 5/2, M1-M2: 4/2 |

FIG. 6

| W/L RATIOS FOR CMOS TRANSISTORS ||
| --- | --- |
| *Sub-Circuit* | *Components* |
| Summing Resistors | M3A: 4/8, M3B: 4/10, M4A: 4/2, M4B: 4/2 |
| Buffers | M5-M6: 4/4, M31-M32: 4/4 |
| Inverters | M19-M22: 5/2 |
| Gate Voltage Circuit | M23: 4/4, M24: 4/2, M25: 4/2, M26: 432, M27: 4/2 |
| NVCM | M33: 8/4, , M34: 4/4, M35: 8/4, M33'': 4/4, M34'': 4/2, M35'': 8/4 |
| PVCM | M33': 4/4, M34': 4/4, M35': 4/9 |
| Switch Transistors | M1-M2: 4/4, Ms_1 & Ms_1':5/2, Ms_2 & Ms_2': 5/2 |

FIG. 15

BIOMIMIC ARTIFICIAL NEURON

PRIORITY CLAIM

The present application claims priority of provisional application Ser. No. 60/487,710 filed Jul. 16, 2003 and having the same title.

The U.S. Government has a paid-up license in this invention and the right in limited circumstances to require that patent owner to license others on reasonable terms as provided for by the terms of Contract No. EPS-0132626 awarded by NSF-Idaho EPSCoR Program and the National Science Foundation.

BACKGROUND

Artificial neural networks (ANN) are used in computing environments where mathematical algorithms cannot describe a problem to be solved. ANNs are often used for speech recognition, optical character recognition, image processing, and numerous other mathematically ill-posed computation and signal processing problems. ANNs are able to learn by example and, when receiving an unrecognized input signal, can generalize based upon past experiences.

A given ANN is made up, at least in part, of a number of interconnected artificial neuron circuits. The output signal of a given neuron is dependent upon a series of input signals received from a group of other artificial neurons or from sensor or transducer input devices. In the case of a pulse coded ANN, the output signal changes based upon factors like the delay between a pair of input signals. The output of an artificial neuron is often called its "activation." This "activation" ranges from no or very low activation to high-level activation. In a pulse-coded neuron the level of activation is measured in terms of the frequency and duration of output pulses which are called "action potentials" after the name given to the outputs of biological neurons.

The activation of a pulse-coded artificial neuron is typically based on a nonlinear spatial and temporal sum of its inputs. Spatial sum means the sum of all the inputs that are active at the same time. Temporal sum means that all the inputs are summed with a forgetting factor commonly referred to as a leaky integral. Leaky integrators are key subsystems in pulse-mode artificial neurons as they are responsible for spatially and temporally summing the input signals to determine the artificial neuron's activation.

A given pulse-mode artificial neural network will have dozens to hundreds of leaky integrators. Using conventional approaches, each leaky integrator circuit requires the use of one or more integrated capacitors. Compared to the size of other leaky integrator components, a capacitor is large and requires a substantial amount of space. For example a one picofarad capacitor requires on the order of 2000 square micrometers of space on an integrated circuit fabricated using a standard process. An integrated transistor, in contrast, may require less than ten square micrometers.

If the capacitors can be replaced with smaller components such as transistors, the size of a pulse-mode artificial neuron can be reduced. Moreover, conventional leaky integrators have fixed time constants. If the time constant can be adapted or altered, a pulse-mode artificial neuron could better mimic a biological neuron.

DESCRIPTION OF THE DRAWINGS

FIG. 3 is a graph illustrating variation of pulse responses as a function of input signal level of the circuit shown in FIG. 1.

FIG. 6 is a table listing the component functions and sizes for the artificial neuron of FIG. 5.

FIG. 15 is a table listing the component sizes for the artificial neuron of FIG. 14.

DETAILED DESCRIPTION

CAPACITOR FREE LEAKY INTEGRATOR: The leaky integrator is a key subsystem in pulse-mode artificial neurons. In most implementations reported to date the leaky integrator function has been implemented using integrated capacitors and with fixed time constants. More recently it has been noted that mimicking real biological systems is better accomplished if the integrator time constants are adaptable and if different time constants are realized for rising and falling edges of the circuit's pulse response.

The present invention provides a capacitor-free leaky integrator. Integration is performed using nonlinear resistance supplied by triode-region-biased PMOS transistors operated near the weak inversion region. A large time constant can be obtained using a low-gain non-inverting amplifier to make use of the parasitic capacitance of the transistors.

Figure 1:
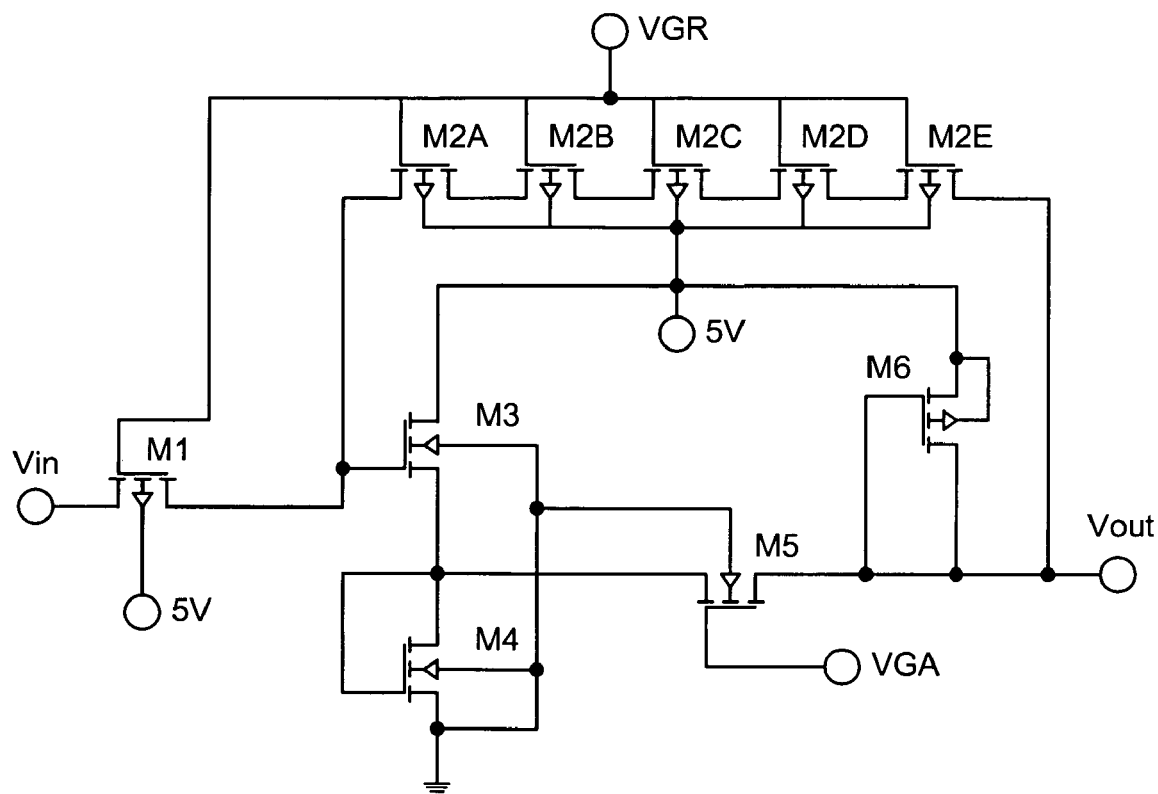
FIG. 1 is a circuit diagram of a capacitor-free leaky integrator circuit according to an embodiment of the present invention.

The Circuit: The invented leaky integrator circuit is shown in FIG. 1. PMOS transistors M1 and M2A–M2E provide the nonlinear resistance. These components are referred to as "delay resistors" since it is the RC time constants due to these components that effects the circuit's integration response characteristics. Each of these components have identical geometry with width-to-length (W/L) ratios of one to one (1:1). It is expected that the size of each transistor M1 and M2A–M2E will be 3 μm/3 μm or $9^2$ μm.

NMOS transistors M3–M5 and PMOS transistor M6 comprise a common-gate amplifier designed to have a nominal small signal gain of 2.5 V/V for positive-going input signals at the quiescent bias point (Q-point). M3, M4, and M5 have W/L ratios of 4:1 (20 μm/5 μm), 10:1 (50 μm/5 μm), and 10:1 (50 μm/5 μm) respectively. Q-point drain current for M5 is 68 nA, of which 51 nA is drawn through M2, when $V_{GR}$ is 1.0 volts and $V_{GA}$ is 2.2 volts. Under these conditions the Q-point output voltage, Vout, is 2 volts for $V_{IN}$ equals 2.6 volts. PMOS load device M6 has W/L ratio of 4:5 (4 μm/5 μm).

In an alternate embodiment PMOS transistors M2A–M2E can be replaced with a single larger PMOS transistor having a W/L ratio of 1:5 (3 μm/15 μm). This results in a less "complicated" circuit. However, using five smaller PMOS transistors allows the circuit area filled by the leaky integrator to be minimized while assisting in parameter matching during circuit fabrication.

Figure 2:
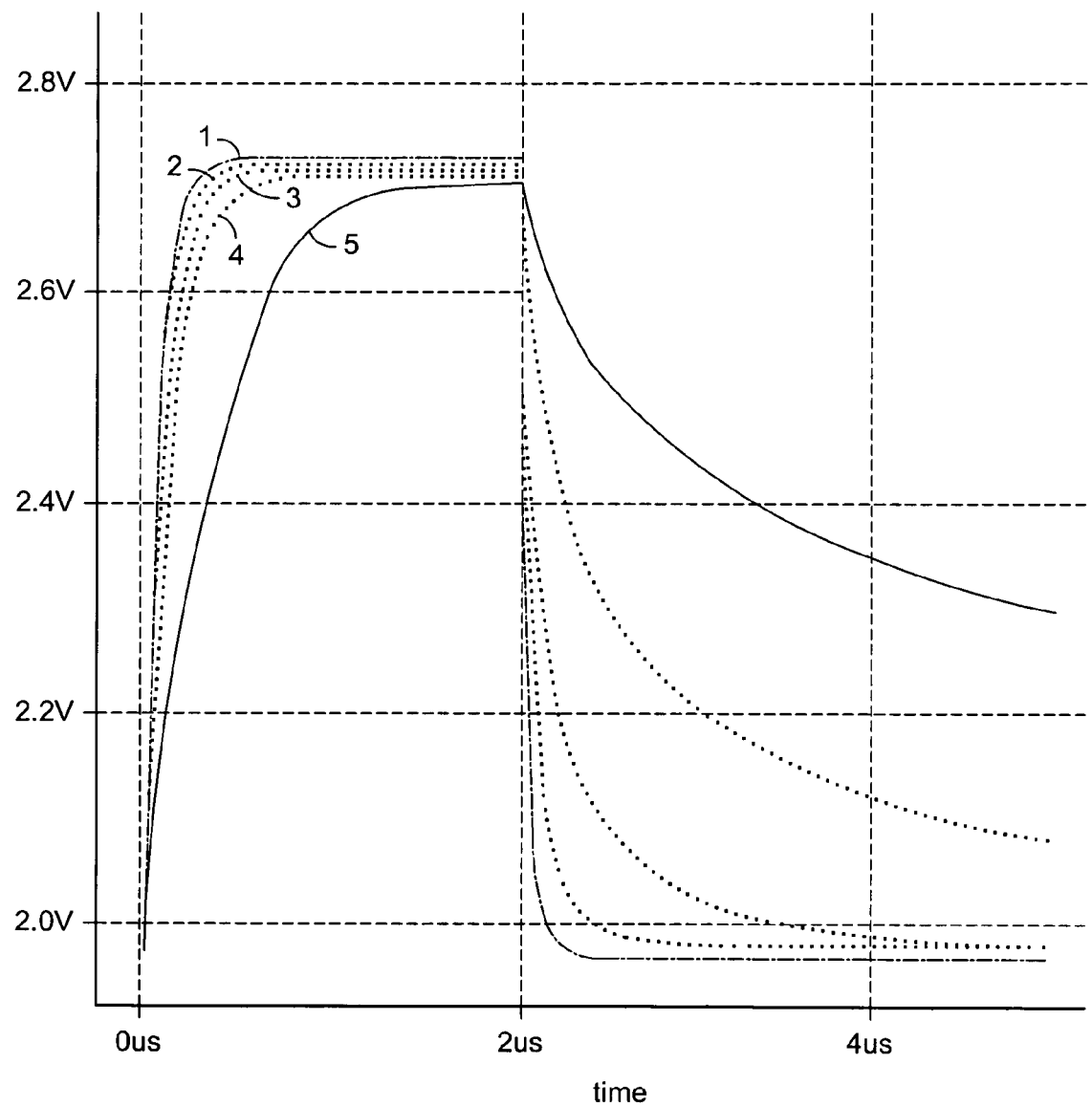
FIG. 2 is a graph illustrating pulse response as a function of delay-resistor gate bias of the circuit shown in FIG. 1.

Pulse response: Dynamic response of this circuit is a function of the delay-resistor bias $V_{GR}$ and the input signal level $V_{IN}$. Our input Q-point design is 2.6 volts. FIG. 2 shows the response of the circuit as a function of $V_{GR}$ to a 0.25 volt input pulse over a range of $V_{GR}$ from 1.0 to 1.4 volts in 0.1 volt increments. The slowest response is obtained for $V_{GR}$=1.4 volts and speeds up as $V_{GR}$ is decreased. The 0.25 volt input pulse is measured peak to peak and is relative to the Q-point.

This response is qualitatively easy to understand. The delay resistor M2 time constant goes approximately as $$\tau = \frac{2L^2}{\mu[2(V_{SG} - V_T) - V_{SD}]}$$

where $V_{SG}$ is the source-to-gate voltage, $V_T$ is the threshold voltage, $V_{SD}$ is the source-to-drain voltage and μ is the carrier mobility. In response to a positive-going input $V_{SG}$ increases whereas the use of multiple transistors M2A–M2E keeps $V_{SD}$ from matching this increase despite the gain of the amplifier. This accounts for the relatively rapid rising edge of the circuit response. On the falling edge, however, we have decreasing $V_{SG}$ and consequently an increasing τ on the falling edge. At higher $V_{GR}$ settings the M2A–M2E transistors leave the strong inversion region resulting in a very low conductance at the Q-point.

The circuit response is a function of input signal level. FIG. 3 illustrates the response of the circuit to input pulses of 0.1 through 0.35 volts in 50 mV steps where $V_{GR}$=1.3 volts. Slower responses are obtained for the lower-level input signals. Rise time response decreases up to an input of 0.25 volts. The anomalous rise time response for 0.30 volts is due to a nonlinear transfer characteristic of the amplifier and is caused by the $V_{SG}$ of M5 leaving the strong inversion region. The apparent decrease in rise time response for 0.35 volts input is due to M5 becoming cut off. Note that the fall time response initially decreases at higher input signal levels but then slows down as the output returns to its Q-point. This behavior is consistent with that of biological neurons.

Figure 4:
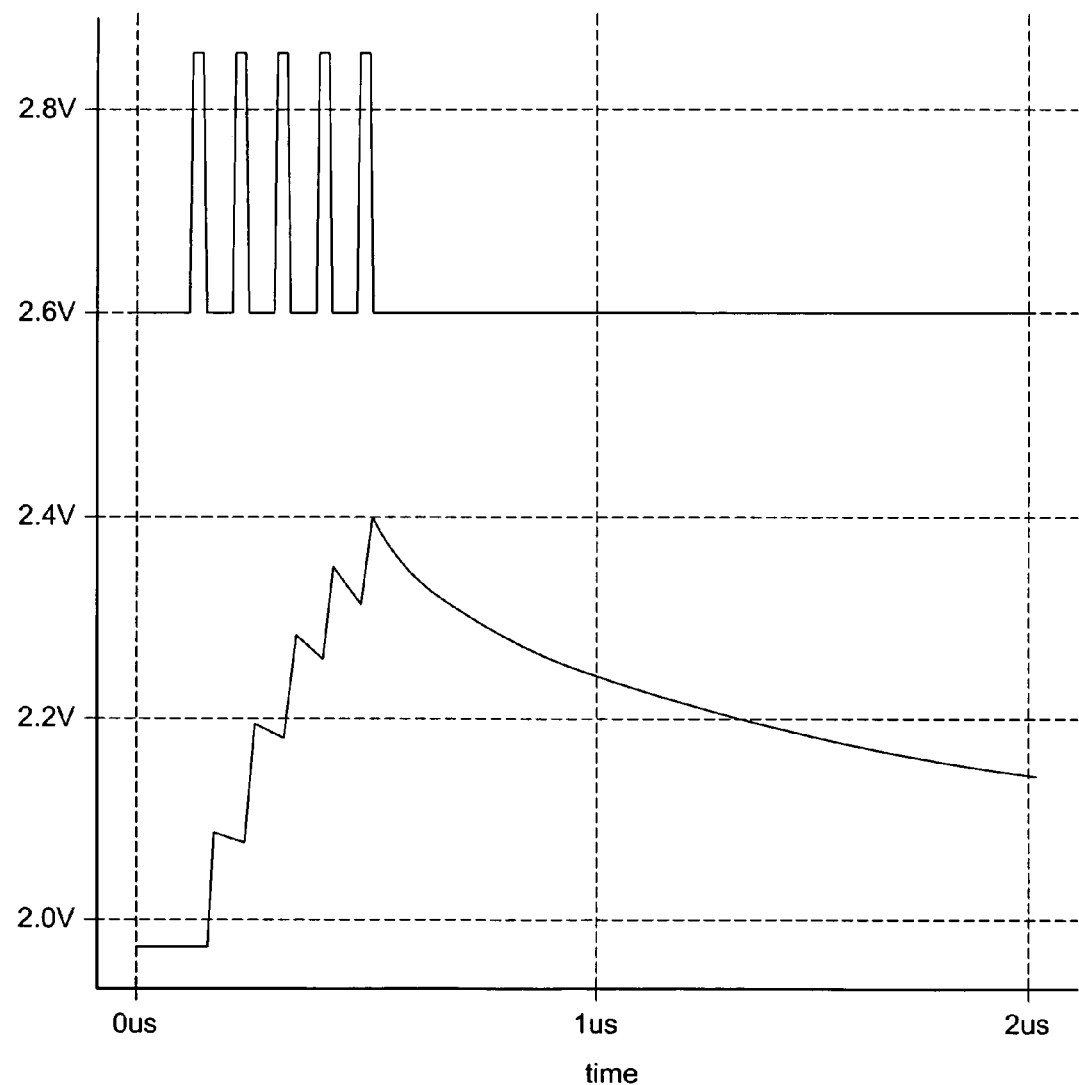
FIGS. 4 is a graph illustrating the integration response of the circuit shown in FIG. 1.

The circuit's behavior as an integrator is illustrated in FIG. 4. The input signal consists of 5 equally-spaced 0.25 volt pulses with 10 nanosecond rise and fall times and a total width of 40 nanoseconds. $V_{GR}$ was set at 1.3 volts. Of note is the rapid integration of the pulse inputs and the slow decay of the response tail at the cessation of the input. Also worthy of note is the fact that the tail's decay takes place over an interval of a few microseconds despite the absence of any explicitly-integrated capacitors in the circuit.

BIOMIMIC ARTIFICIAL NEURON: The design of a non-linear, capacitor-free leaky integrator (LI) has been shown and described above. The differing rise and fall times of the LI and the capability of controlling the slower fall time via the gate voltages of non-linear input and feedback resistors (NLR s) formed from triode-region-biased PMOS transistors have been utilized to design an integrate-and-fire biomimic artificial neuron (BAN) shown in FIG. 5. The output of the LI is applied to a Schmitt trigger/inverter (ST/I) circuit. The high threshold output state of the ST/I constitutes the action potential of the BAN. The AP output disables excitatory current to the excitatory summing resistor (ESR) of the LI input, and switches the non-linear resistor (NLR) gate voltages to obtain a fast fall time during LI discharge. This results in repolarization of the LI until the low threshold ST/I trigger is reached (1.83 volts for this design), and the AP pulse is ended. Integration can then resume until the high threshold trigger level (2.65 volts for this design) is reached and the cycle repeats. Higher average input current levels result in higher AP pulse repetition rates. Thus the average excitatory input current level is frequency modulated by the BAN.

The AP pulse width is modulated by controlling the NLR gate voltage during the AP output pulse. A higher NLR gate voltage results in a slower fall time of the LI, effectively delaying the time to reach the ST/I low threshold trigger level. The repolarization fall time is controlled by a clamping voltage (Vclamp) in the gate voltage sub-circuit. A series PMOS transistor in the feedback path of the inverted AP output (M23 in FIG. 5) controls the LI time constant during integration. When the gate of the feedback path transistor is at ground the maximum available voltage is applied to the NRL gate voltage circuit, yielding low LI leakage during integration. If the gate of the transistor is lifted above ground, the gate voltage of the NLR transistors is reduced, resulting in higher leakage for the LI. When the gate of M23 is greater than +4V, the feedback voltage is cut off, and the leakage during integration equals that of repolarization.

This control capability can be used to implement inhibitory synapses. An inhibitory pulse input diverts a portion of the ESR bias current to a second, inhibitory summing resistor (ISR). The ISR voltage raises the gate voltage of M23, decreasing the Li time constant during an inhibitory input. This allows inhibitory pulses to pull the LI output lower and hence acts to inhibit firing the ST/I. In addition, an AP pulse-width modulation control can be implemented by switching Vclamp between two levels via an unclocked JK flip flop. This provides the BAN with an ability to mimic binary metabotropic modulatory input effects. Extension to m-ary modulation is straightforward.

Figure 5:
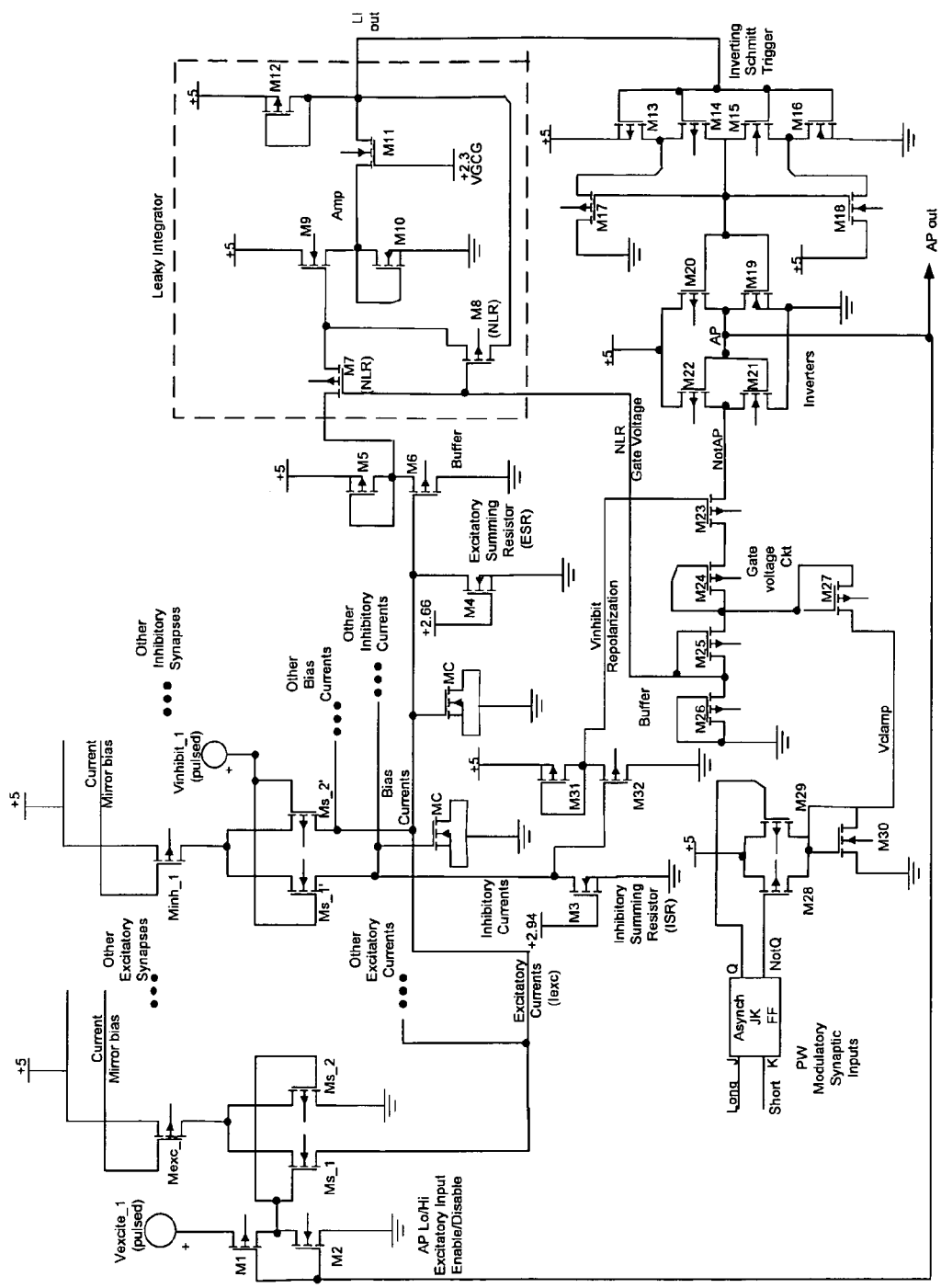
FIG. 5 is a circuit diagram of a capacitor-free leaky integrator as in integral part of an artificial neuron with Schmitt trigger action potential pulsed outputs, independent excitatory and inhibitory pulsed inputs, and modulatory pulse width control according to an embodiment of the present invention.

Circuit: A schematic of the circuit is shown in FIG. 5. The JK flip flop circuit is standard, and its details are omitted for brevity. Synaptic input weights are the current levels from transistor current mirrors Mexc and Minh, and therefore the W/L ratios are application-dependent. The current mirror bias circuit is a standard design and thus is not shown. Switch transistors, Ms_1 and Ms_2, have W/L ratios that are application-dependant; for this design they are set to 5/2. The two MC transistors simulate layout capacitances in the excitatory and inhibitory current paths.

The table in FIG. 6 lists the W/L ratios in μm for all the transistors in the circuit. All NMOS bodies are tied to ground, and all PMOS bodies are tied to +5V. The bias voltage circuits for M3, M4 and M11 are standard and are not shown. The total bias and excitatory input current flows through the ESR M4. The diverted inhibitory current flows through the ISR M3. The resulting voltages are level-translated by the source follower buffer circuits formed by M5/M6 and M31/M32 for excitatory and inhibitory cases, respectively. The buffered excitatory voltage is applied to the input NLR of the LI at the source of M7. The output of the LI at the drain of M11 goes to the ST/I circuit input. The AP output of the ST/I is fed to the gates of M1 and M2, which is the excitatory input enable/disable switch, cutting off the synaptic input signal while diverting the excitatory input currents to ground during AP firing. The inverted AP output (NotAP) is fed to the gate voltage circuit at the source of M23. The NLR gate voltage at the source of M26 is controlled by the combination of the gate voltage of M23 and the level of Vclamp. The voltage at the gate of M23 is governed by the buffered ISR voltage at the source of M32. Without an inhibitory input it is around 2.2 volts, and with inhibitory inputs it is lifted above that to a maximum of about 4 volts, depending upon the total diverted inhibitory current. The voltage at Vclamp is determined by the switching of M28 and M29, changing the voltage divider ratio with M30. The output states, Q and NotQ, of the JK flip flop define the switching of M28 and M29. The pulsed J and K inputs provide for metabotropic pulse-width-modulation synaptic inputs, defined here as "long" and "short."

The excitatory and bias current sources are gated by the input switches, which are activated by excitatory or inhibitory AP inputs. Input pulses are active-high. The bias current is always present, and it is formed from the sum of the inhibitory synapse current sources. Inhibitory pulses divert bias current to the ISR, M3, when the inhibitory input AP is high.

The AP output voltage of the neuron is inverted prior to being applied to the gate voltage circuit at the source of M23. When the AP output is low the source of M23 is at +5 volts, and when the AP output is high the source of M23 is at ground. When the gate of M23 is low, the PMOS resistance is minimal and the maximum voltage available at the source of M23 is applied to the source of M24. While the AP output is low this results in about 1.96 volts being applied to the NLR gates via the source of M26, which yields the maximum decay time constant of the LI during integration.

All excitatory current is diverted to ground when the AP fires. With the neuron AP output high and excitatory inputs disabled, the source of M23 is at ground, causing the gate voltage circuit output at the source of M26 to drop to a level dependant upon the voltage Vclamp at the source of M27. This reduces the decay time constant of the LI. The speed of the LI fall time when M23 is cut off is governed by the voltage Vclamp at the source of M27. A lower Vclamp yields a faster fall time during repolarization (AP high) and a narrower AP. Raising Vclamp results in longer repolarization times, hence a wider output AP.

Changing the gate voltage of M23 varies the speed of the decay fall time of the LI. M23 is effectively cut off by a gate voltage of +4V or higher, which speeds up the fall time of the LI to the rate governed by Vclamp. The inhibitory current summed at the ISR, M3, produces the control voltage for M23. When an inhibitory pulse diverts current to the ISR, the LI fall time is shortened, effectively yanking the signal down in response to the inhibitory input.

For this BAN a two-state setting of Vclamp is provided by the asynchronous JK flip flop. Realization of a larger number of AP pulse widths is straightforward.

Figure 7:
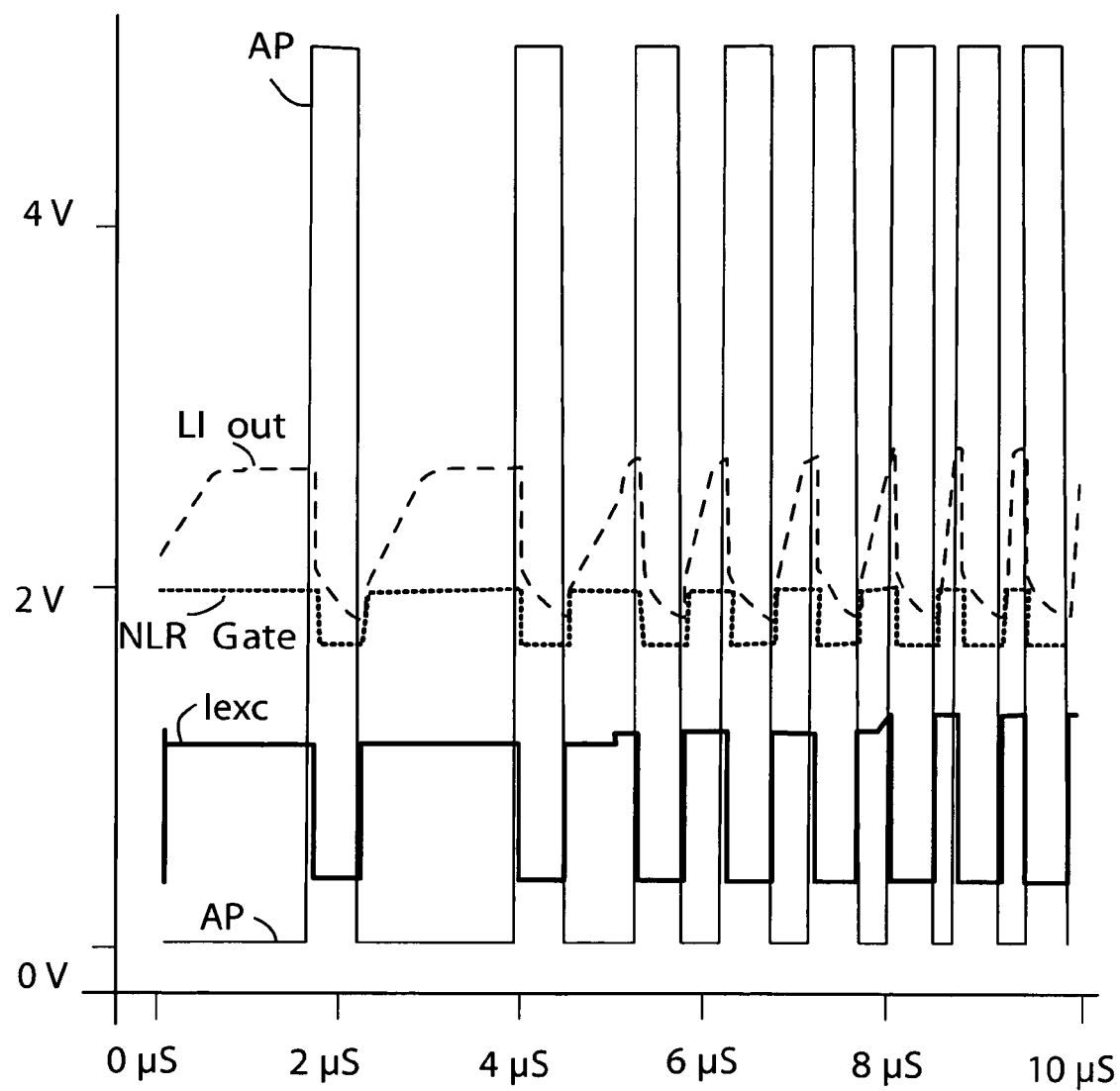
FIG. 7 is a graph illustrating an increasing output pulse repetition rate caused by increasing input currents for the artificial neuron of FIG. 5.

Output Pulse Repetition Rate: FIG. 7 shows that the output pulse repetition rate increases with an input current step of 5 μA over the input level range of 100 μA to 110 μA, with a bias current level of 80 μA. Each input current increment (at 5 μs and 7.8 μs) increases the frequency of output APs. The AP pulse width is about 450 ns.

Figure 8:
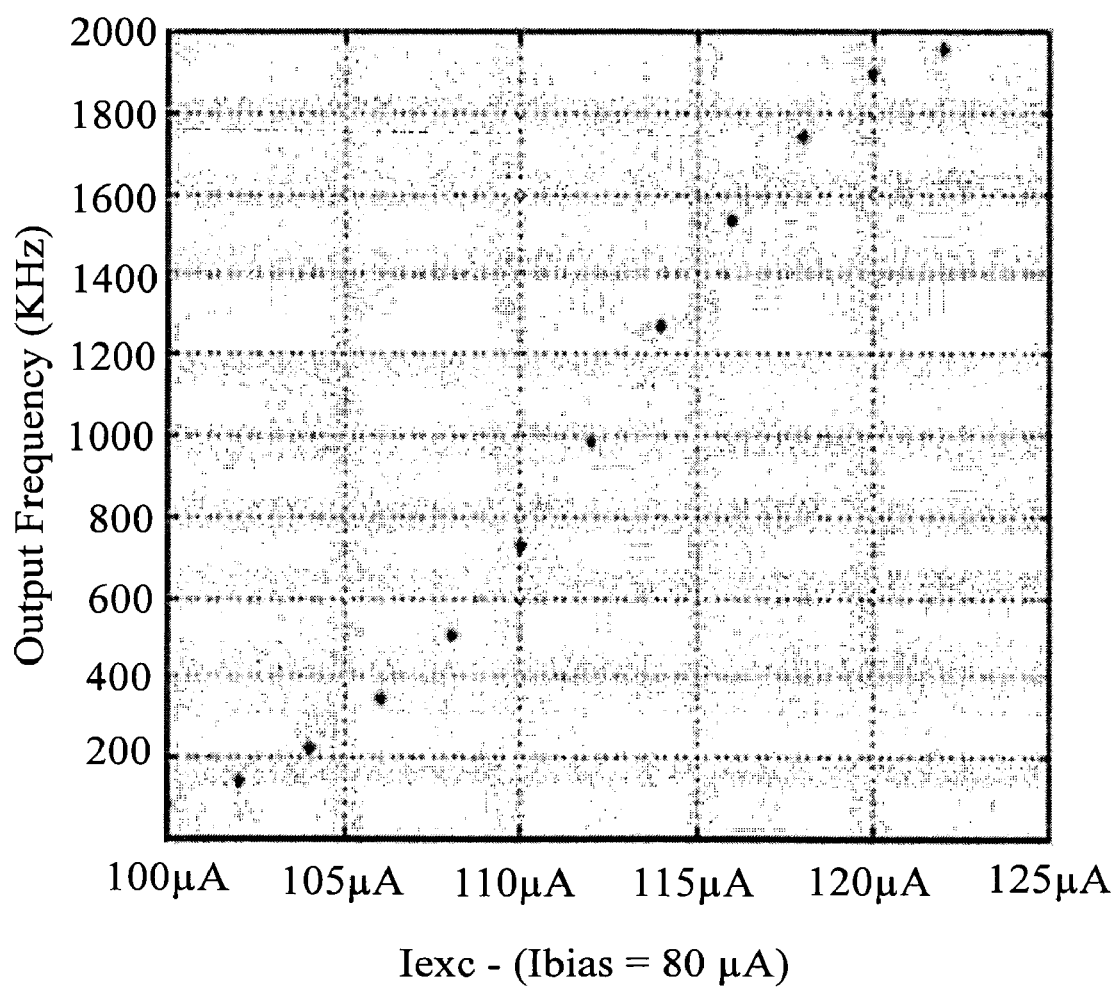
FIG. 8 is a graph illustrating an increasing output pulse frequency in relation to excitatory current for the artificial neuron of FIG. 5.

Frequency vs. Current Level: FIG. 8 depicts the frequency vs. current level over the 100 μA to 122 μA range in 2 μA increments, with a bias level of 80 μA. Not shown are the lower limit, which is where ST/I firing thresholds are not achieved, and the upper limit, where firing is instantaneous upon the ending of the AP. Within the range shown the curve demonstrates a sigmoidal transfer characteristic. Midband gain is 140 kHz/μA.

Figure 9:
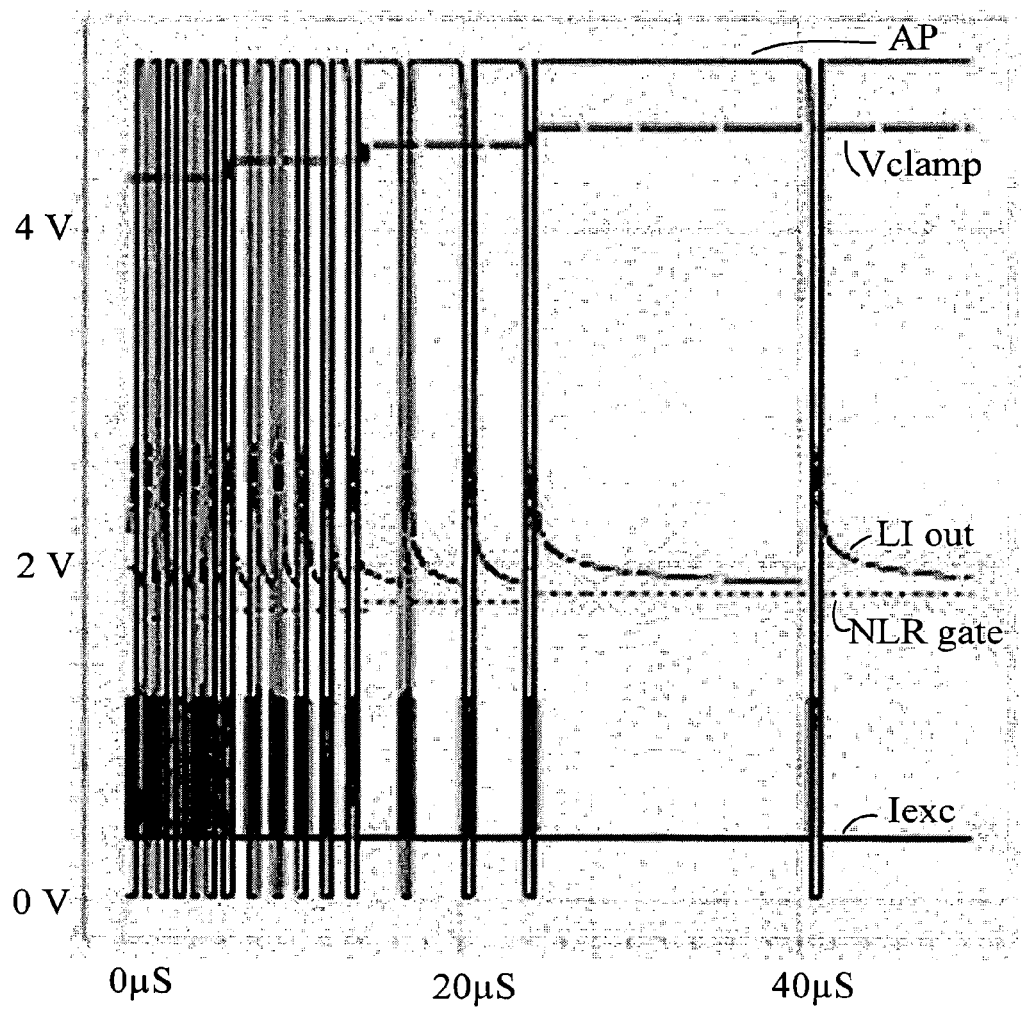
FIG. 9 is a graph illustrating the modulation of the output pulse width caused by variation in clamping voltage for the neuron of FIG. 5.

Pulse Width Modulation: FIG. 9 shows AP output pulses which are pulse-width modulated by changing Vclamp. The repolarization fall time is varied due to the variation of Vclamp from 4.3 to 4.6 volts in steps of 0.1 volts at 6, 14, and 24 μs, respectively. Longer and shorter fall times exist beyond this range of Vclamp but are not shown here. The NLR gate voltage during integration is set at 1.96 volts, resulting in a fixed LI rise time of 1.74 μs between APs at the input current levels used here. $I_{bias}$ is 80 μA dc and $I_{exc}$ is 95 μA dc. This produces the rising voltage of the LI output from the lower ST/I threshold of 1.83 volts toward the upper threshold of 2.65 volts. Vclamp and the NLR gate voltages are shown on the plot. The NLR gate voltage is fixed during integration by the signal NotAP (5 volts). During AP output, NotAP is low, diode M27 is turned on, and the NLR gate voltage is determined by Vclamp and the voltage division circuit M24, M25, and M26.

Figure 10:
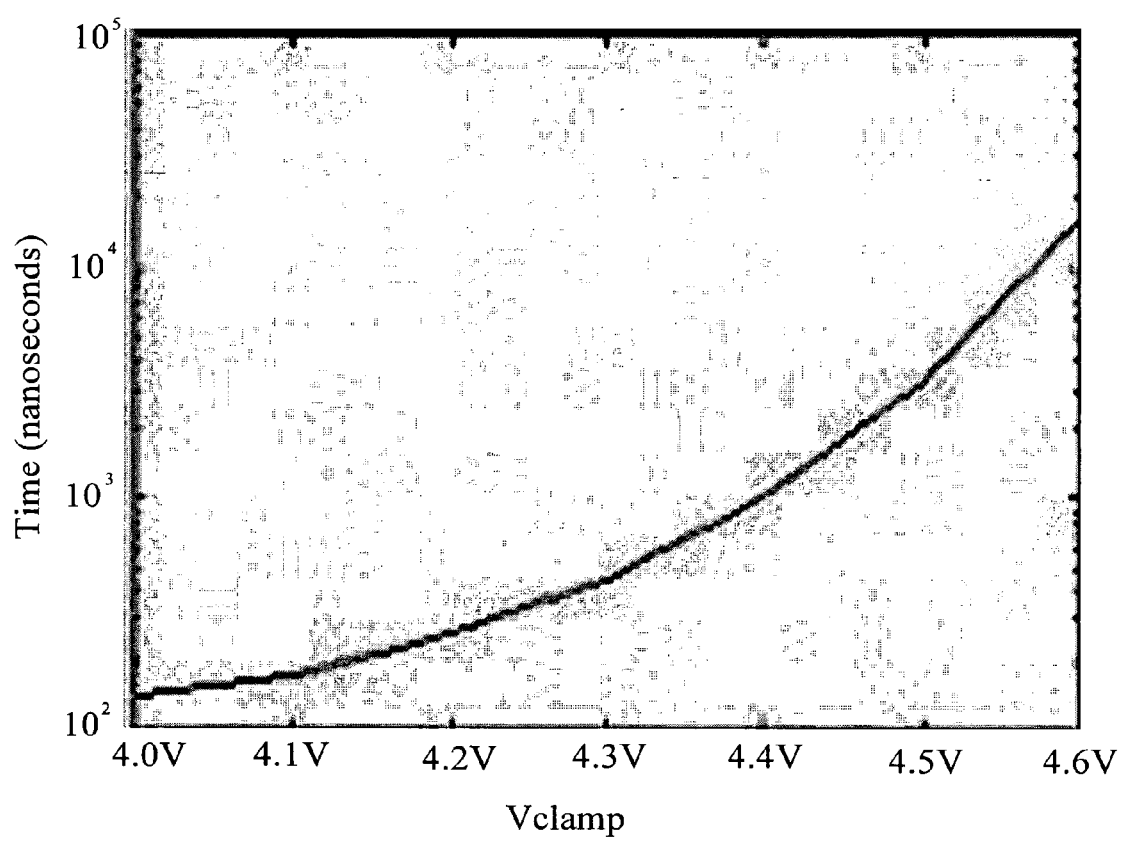
FIG. 10 is a graph illustrating output pulse width increase on a logarithmic scale versus clamping voltage settings for the artificial neuron of FIG. 5.

Output Pulse Width Increase: FIG. 10 shows the output pulse width increase on a logarithmic scale versus settings of Vclamp. The curve exhibits a monotonic parabolic shape, indicative of a well-behaved pulse-width modulation transfer characteristic. Within narrow operating ranges the curve is almost linear on a logarithmic scale, exhibiting an exponential response in those voltage ranges.

Figure 11:
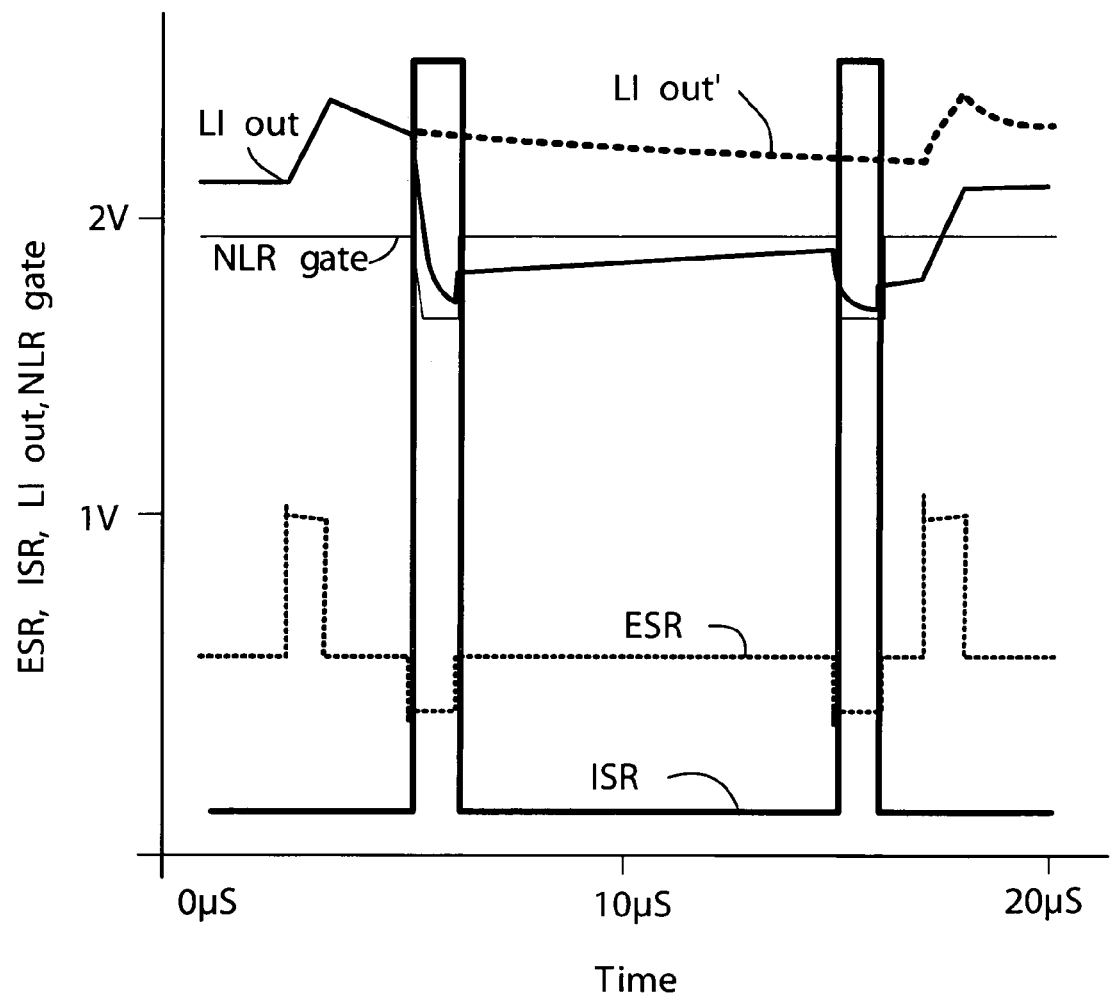
FIG. 11 is a graph illustrating the inhibitory influence on leaky integrator output for the artificial neuron of FIG. 9.

Inhibitory Influence: FIG. 11 illustrates the effect of inhibitory inputs for the cases where the inhibition follows an excitatory input pulse and the case where it precedes an excitatory input pulse. The figure illustrates the case where the sum-total of the excitatory inputs is 60 μA and the sum-total of the inhibitory inputs is 40 μA. The figure also illustrates what the excitatory response would have been if inhibition had not occurred (dashed line at the top of the figure). Comparing this response with that when inhibitory inputs are present, the effect of reducing the LI time constant due to inhibition is easily seen. These results are consistent with the effect of inhibitory inputs on membrane voltage in real neurons.

The ESR response shown in FIG. 11 is disproportionately higher for the positive-going ESR pulses (i.e. excitatory pulses) than for the negative-going (inhibitory) pulses. This is because the ESR transistor is coming out of the triode region under the conditions illustrated in this example. The ISR response is much larger because of the design of M3 and its gate bias setting. This is done to put the buffered control signals (not shown) at the gate of M23 into the desired 2 to 4 volt range.

Other simulations under conditions where the inhibitory inputs are not sufficient to prevent the firing of action potentials (in response to a train of excitatory inputs) reveal that one of the principal effects of inhibition under these conditions is to modulate the firing time of the AP. This constitutes a form of pulse-position modulation of excitatory inputs by inhibitory inputs. Hence, the neuron is able to "encode" fairly complex information within the waveform by means of variations in inter-spike intervals. Hence, this neuron is capable of all three major non-amplitude encoding methods (i.e. pulse width modulation, pulse frequency modulation, and pulse phase modulation) available to pulse-stream neural networks.

WEIGHTED EXCITATORY AND INHIBITORY INPUTS: Synaptic weight in a biological neuron is described by the Hodgkin-Huxley model as the amount of current contributing to the integration of the membrane potential toward the firing level for an action potential (AP). Excitatory synapses add to the membrane potential, and inhibitory synapses subtract from it.

The capacitor-free leaky integrator (LI), discussed above with reference to FIG. 1, has a voltage-controlled fall time. Repolarization time is controlled by the gate voltage of nonlinear resistors (NLRs) formed from PMOS transistors in the LI circuit operating in the triode region. As discussed with reference to FIG. 5, combining the output of the LI with a Schmitt trigger (ST) implements an integrate-and-fire biomimic artificial neuron (BAN). The ST output represents the action potential (AP) of the BAN.

The AP pulse is fed back to repolarize the neuron by lowering the gate voltage of the NLRs, thereby resetting the LI. The BAN allows for excitatory and inhibitory synaptic currents. Synaptic currents are summed into separate summing resistors (SRs). Excitatory synaptic currents sum at the excitatory SR (ESR), inhibitory synaptic currents at the inhibitory SR (ISR). ESR voltage is applied to the LI input. ISR voltage is applied through a scaling amplifier to the NLRs to control the leakage rate of the LI.

The neuron resting potential is set by bias current provided to the ESR by a current source separate from the excitatory current sources. When an inhibitory synapse is pulsed, a portion of the bias current, corresponding to the inhibitory weight, is diverted to the ISR. This results in a negative-going inhibitory pulse to the ESR, producing a reduction in the integrated output of the LI. At the same time the increased voltage at the ISR is level-shifted by a buffer circuit and applied to the gate of a PMOS transistor (M23 of FIG. 5) in the AP feedback path to the NLR gate voltage. The PMOS transistor M23 has +5 volts (the inverted AP (NotAP)) applied to its source during integration. The increase of voltage to M23's gate by the level-shifted ISR output results in a reduction of NLR gate voltage during the inhibitory pulse, increasing the leakage of the LI and thereby partially repolarizing the LI output. Higher inhibitory synaptic currents result in faster decay times and stronger repolarization during inhibition.

Figure 12:
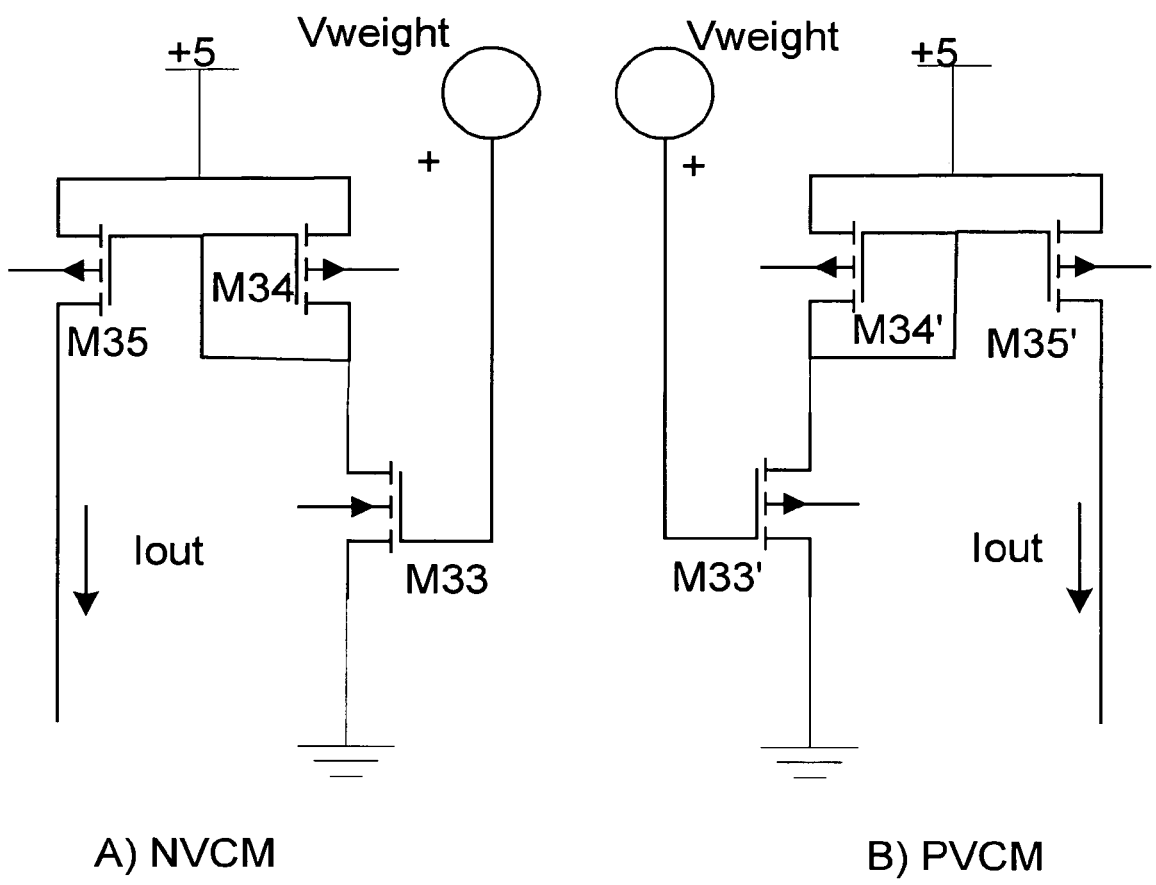
FIG. 12 is a circuit of a variable current mirror circuit for forming weighted excitatory and inhibitory inputs for an artificial neuron according to an embodiment of the present invention.

FIG. 12 illustrates a variable current mirror (VCM) current source designed to control a weighted system of synaptic excitatory and inhibitory inputs to the biomimic artificial neuron (BAN) shown in FIG. 5. The VCM utilizes a drive transistor with a current mirror pair of PMOS transistors. The drive transistor can be either NMOS or PMOS. The former (NVCM) results in a monotonically increasing current output when increasing gate voltage is applied to it, while the latter (PVCM) produces a monotonically decreasing current output with the same applied voltage. W/L ratios of the trio of transistors can be designed to obtain current ranges and output curve slopes as demanded by the application for the BAN.

The design requirements of a variable-weight excitatory synaptic input and that of the inhibitory synaptic input for our BAN differ. The first must be disabled while the AP is re-setting the BAN's leaky integrator (LI), while the second requires that a fixed ESR bias level be maintained independently of the setting of inhibitory synaptic weights. We have met these specifications using simple combinations of current-steering circuits and the VCMs.

Figure 13:
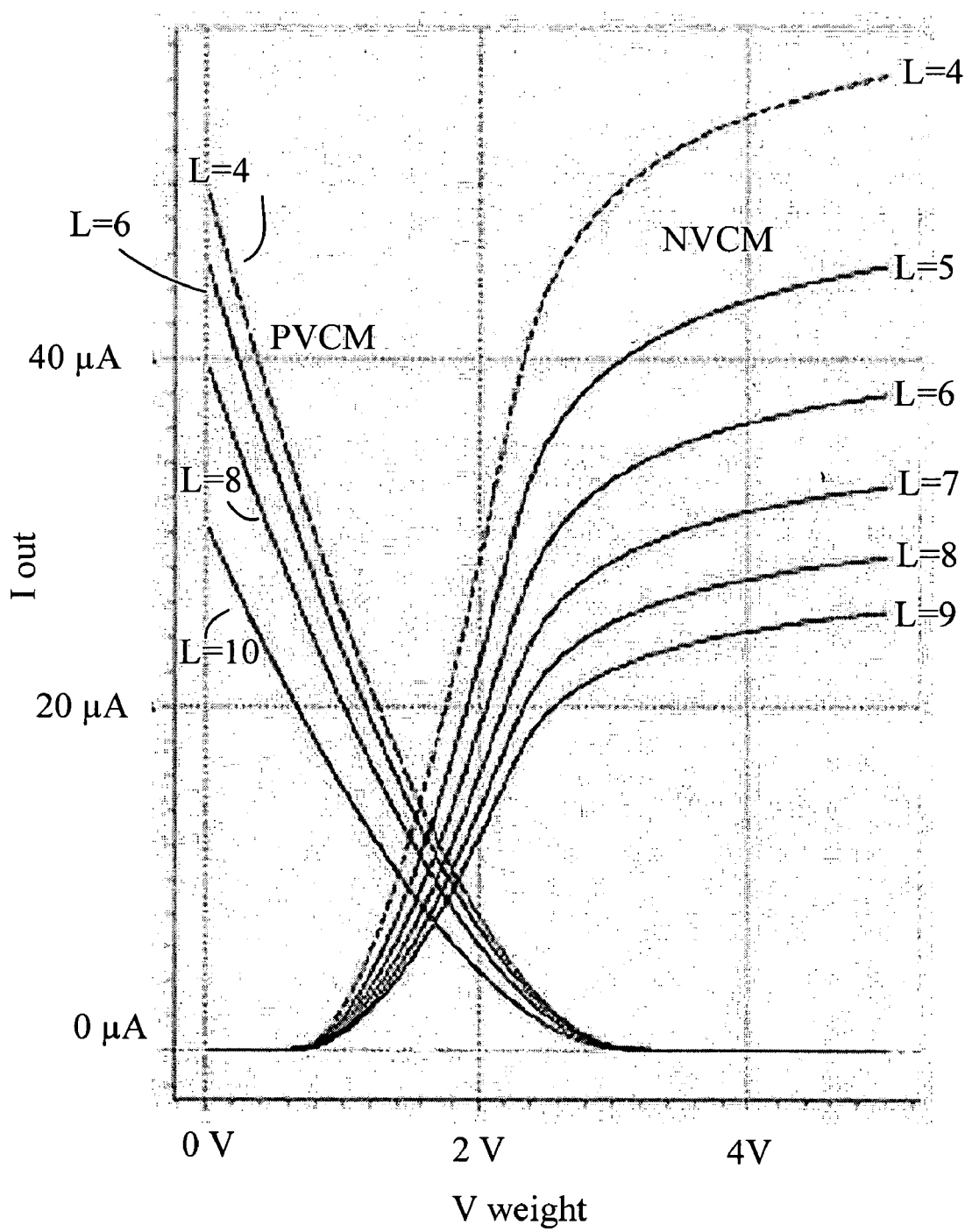
FIG. 13 is a graph illustrating current output as a function of control voltage for the circuit of FIG. 12.

Circuits: Schematics of the NVCM and PVCM circuits are shown in FIG. 12. Current outputs versus control voltages for various W/L sets for the NVCM and the PVCM are shown in FIG. 13. The positive-slope set is for the NVCM, and the negative-slope set is that of the PVCM.

Figure 14:
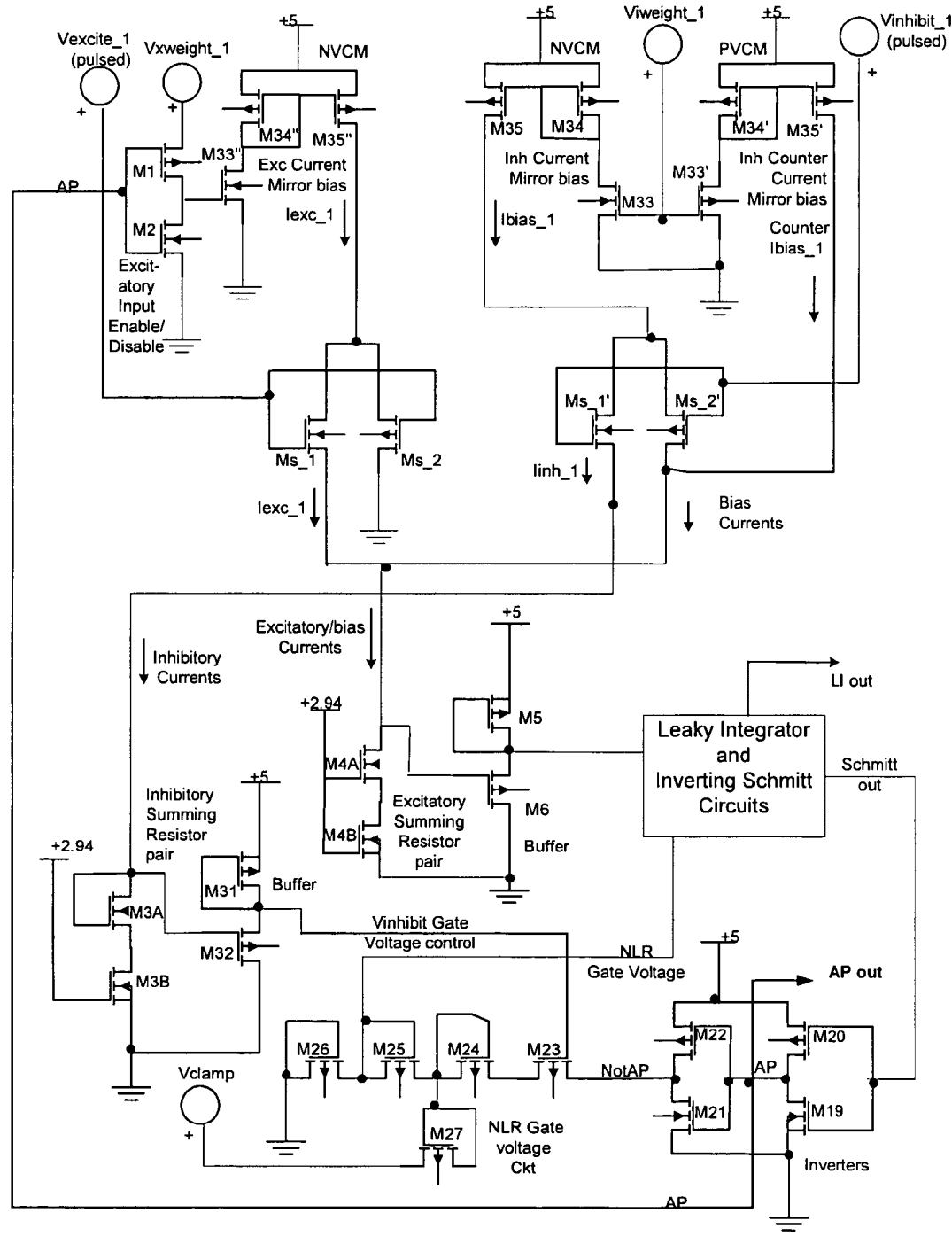
FIG. 14 is a circuit diagram of an artificial neuron with weighted excitatory and inhibitory inputs according to an embodiment of the present invention.

FIG. 14 shows a full BAN circuit. The leaky integrator and Schmitt trigger circuits in the LI/ST block of FIG. 14 were described above with reference to FIG. 5. The table of FIG. 15 lists the W/L ratios of the transistors in microns. M3A, M3B, M31, and M32 form the ISR circuit with its buffer/level translators. M4A, M4B, M5, and M6 form the ESR circuit with its buffer/level translators. M19–M22 are simple inverters. M23–M27 provide gate bias voltage and repolarizing AP feedback to the NLRs of the LI.

M1 and M2 form the enable/disable switch for the synaptic weight control voltage, Vxweight, applied to the gate of M33", the driver for the excitatory NVCM. AP=O applied to the gates of M1 and M2 enables the voltage at the gate of M33", while AP=HIGH drives the gate voltage of M33" to ground, cutting off the current mirror. The current output at the drain of M35" passes through the SPDT switch formed by Ms_1 and Ms_2. The switch is controlled by the synaptic input pulse signal, Vexcite. When Vexcite is low the current is passed through Ms_2 to ground, and when it is high the current is passed through Ms_1 to the ESR. W/L ratios for the design are application-dependent.

The inhibitory synaptic weight circuit includes an NVCM in parallel with a PVCM, driven by the same weight control voltage, Viweight, at the gates of M33 and m33'. The output of the PVCM goes directly to the ESR, and the output of the NVCM goes to the SPDT switch formed by Ms_1' and Ms_2'. The switch is controlled by the synaptic input signal, Vinhibit. When Vinhibit is low, the NVCM output current goes to bias the ESR. When Vinhibit is high, the NVCM current goes to the ISR, thereby constituting in effect a negative current to the ESR. The W/L ratios of the PVCM and NVCM were designed such that their respective current vs. voltage curves intersect at around 10 µA. They are tailored so that the curves within a ±half-volt range of Viweight are symmetric around the intersect point. Assuming a bias of Viweight at 1.8 volts, and Vinhibit low, the total Ibias to the ESR is 2×9.55 µA 19.10 µA. Pulsing Vinhibit diverts 9.55 µA from the total Ibias of 19.10 µA. With Vinhibit low, it is seen from the symmetry of the curve sets of FIG. 13 that the NVCM and PVCM will change symmetrically in opposite sign with increase or decrease of Viweight, resulting in a fixed Ibias of 19.10 µA to the ESR. When Vinhibit is high, however, different weights of inhibitory currents result, depending upon the value of Viweight: Viweight>1.8 volts yields inhibitory currents greater than 9.55 µA, and Viweight<1.8 volts produces inhibitory currents less than 9.55 µA. In all cases the inhibitory currents are subtracted from the constant Ibias level of 19.10 µA.

Figure 16:
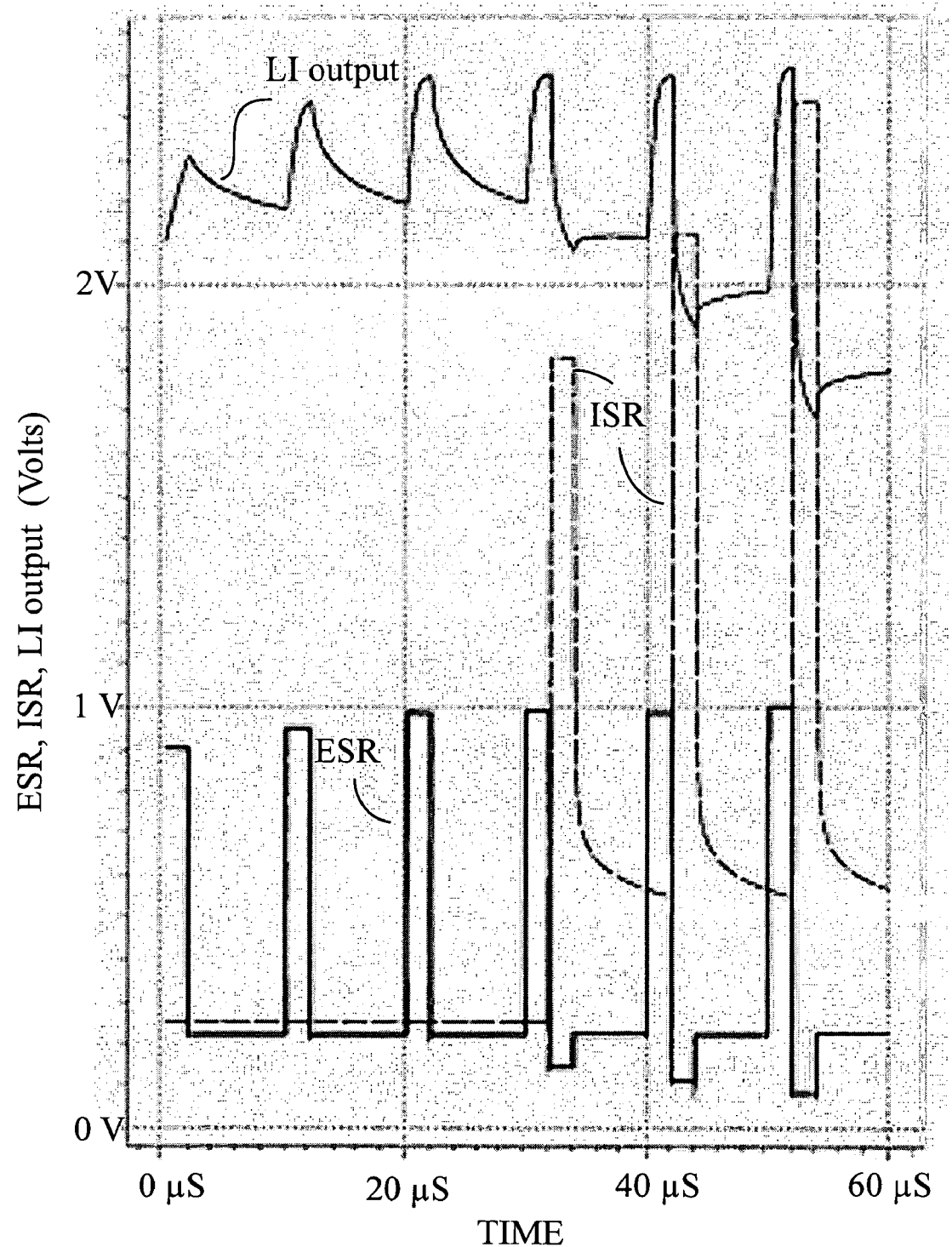
FIG. 16 is a graph illustrating various output voltages as a function of variously weighted inhibitory and excitatory input pulses for the artificial neuron of FIG. 14.

Resulting Voltage Levels: FIG. 16 is a graph illustrating various output voltages as a function of variously weighted inhibitory and excitatory input pulses for the artificial neuron of FIG. 14. The graph shows both the excitatory and inhibitory weight controls on the LI output in a non-firing integrating mode.

The first three 1 µs excitatory pulses (lowest trace) are without inhibitory inputs and Vxweights of 2.4, 2.5 and 2.6

Volts, corresponding to current pulses of approximately 59.8, 61.8 and 63.3 µA, respectively. For this case Viweight was set at 1.7 volts, and the bias was 18.5 µA. The last 3 excitatory pulses are for Vxweight of 2.6 Volts. 1 µs inhibitory pulses (middle trace, dashed) are input immediately after the ends of the excitatory pulses with Viweights of 1.6, 1.8 and 2.0 Volts, corresponding to inhibitory currents of 6.3, 9.0 and 12.0 µA, respectively.

The relative differences in the heights of the ISR peaks and the depths of the corresponding ESR notches for the inhibitory pulses are due to design differences in the SRs. Note that the current bias levels remain fixed with change in inhibitory weights and that the negative current levels of the inhibited ESR voltage reflect the changes of Viweight. Lastly, the LI output (upper trace) shows the influence of the increasing weights of the first 3 excitatory pulses. The LI output also displays the weight changes of the inhibitory pulses, both in the overall drop of output levels and in the decreased fall times, with inhibitory weight increases due to the buffered outputs of the ISR to the gate of M23.

CONCLUSION: It has been shown above that the properties of the capacitor-free LI can be utilized to mimic many of the basic behaviors of a biological neuron. The capability of controlling the fall time of the LI by the NLR gate voltage during the various states of the synaptic inputs and AP outputs in this design demonstrates great versatility of the LI circuit. The achievement of excitation, inhibition, integration, AP firing and repolarization, as well as modulatory control over all these biological neuron behaviors, is accomplished with relatively simple all-CMOS circuitry and no integrated passive components.

What is claimed is:

1. An artificial neuron, comprising a plurality of tangible electronic elements interconnected to form:
   an input subcircuit for supplying a pulsed input signal;
   a capacitor free leaky integrator subcircuit operable to supply a parasitic capacitance and to utilize the parasitic capacitance to provide differing time constants for the rising and falling edges of an output signal produced in response to the pulsed input signal; and
   an output switching subcircuit operable upon receipt of a sufficient output signal from the capacitor free leaky integrator subcircuit to switch off the input subcircuit and to release a neuron firing signal.

2. The artificial neuron of claim 1, wherein the capacitor free leaky integrator subcircuit comprises:
   a capacitor-free, non-linear delay resistor having a parasitic capacitance; and
   a capacitor-free amplifier tied to the delay resistor wherein the amplifier utilizes the parasitic capacitance of the delay resistor to provide the differing time constants for the rising and falling edges of the output signal produced in response to the pulsed input signal.

3. The artificial neuron of claim 2, wherein the delay resistor includes a first transistor and a second transistor each having source, a drain, and a gate; and wherein
   for the first transistor:
      the source defines an input for the leaky integrator; and
      the drain is tied to the amplifier; and
   for the second transistor:
      the source is tied to the drain of the first transistor; and
      the drain is tied to the capacitor-free amplifier and an output of the capacitor free leaky integrator.

4. The artificial neuron of claim 1, wherein the output switching subcircuit comprises an inverting Schmidt trigger.

5. The artificial neuron of claim 1, wherein the input subcircuit for supplying a pulsed input signal comprises an input subcircuit for supplying a pulsed excitatory signal and a pulsed inhibitory signal.

6. The artificial neuron of claim 1, wherein an increased inhibitory signal causes a decrease in the time constant provided by the capacitor-free leaky integrator.

* * * * *